United States Patent [19]
Sakai et al.

[11] Patent Number: 5,475,293
[45] Date of Patent: Dec. 12, 1995

[54] METHOD FOR MEASURING CHARACTERISTIC CONSTANTS OF ALTERNATING CURRENT MOTOR AND CONTROLLER THEREOF BASED ON SAID METHOD

[75] Inventors: Keijiro Sakai; Tsunehiro Endo, both of Hitachioota; Toshiaki Okuyama, Toukai; Hiroshi Fujii, Chiba, all of Japan

[73] Assignee: Hitachi, Ltd., Tokyo, Japan

[21] Appl. No.: 121,896

[22] Filed: Sep. 16, 1993

[30] Foreign Application Priority Data

Sep. 16, 1992 [JP] Japan ................... 4-246147
Mar. 12, 1993 [JP] Japan ................... 5-51612

[51] Int. Cl.$^6$ .......................................... H02P 5/34
[52] U.S. Cl. ........................ 318/802; 318/807; 318/811
[58] Field of Search ......................... 318/798–804, 318/805–814, 727, 749, 767–768

[56] References Cited

U.S. PATENT DOCUMENTS

| | | | |
|---|---|---|---|
| 4,259,628 | 3/1981 | Iwakano et al. | 318/808 X |
| 4,749,932 | 5/1988 | Yonemoto | 318/762 X |
| 4,767,976 | 8/1988 | Mutoh et al. | 318/808 |
| 4,843,296 | 6/1989 | Tanaka | 318/801 X |

FOREIGN PATENT DOCUMENTS 0250799 7/1988 European Pat. Off. .

OTHER PUBLICATIONS

Conference Record of the 1989 IEEE Industry Applications, Societey Annual Meetings, Oct. 5, 1989, pp. 7–11, T. Kataoka et al., "Starting performance prediction of an inventor fed induction motor".

IEEE Transactions of Industry Applications, vol. 28, No. 3, Jun. 1992, pp. 581–588, W. Baader, et al., "Direct Self Control (DSC) of Inverter–Fed Induction Machine: A Basis for Speed Control Without Speed Measurement".

Patent Abstracts of Japan, vol. 10, No. 268 (E–436) Sep. 12, 1986, & JP–A–61 092 185.

Patent Abstracts of Japan, vol. 10, No. 24 (E–377), Jan. 30, 1986 & JP–A–60 183 953.

Patent Abstracts of Japan, vol. 18, No. 92 (P–1693) Feb., 1994, & JP–A–05 297 079.

*Primary Examiner*—David S. Martin
*Attorney, Agent, or Firm*—Antonelli, Terry, Stout & Kraus

[57] ABSTRACT

An inverter corrects an output voltage in accordance with the magnitude of output voltage error due to a dead time and an ON-state voltage drop in power elements so as to energize an AC motor in a manner of single phase alternating current excitation, by calculating an active component of current Iq and a reactive component of current Id from the phase θ of an excitation voltage vector and a detected instantaneous current value iu, and by measuring characteristic constants of the motor, including a combined resistance $(r_1+r_2)$ and a combined leakage inductance $(l_1+l_2)$, from an excitation voltage command value $Vc_1$, Id and Iq. The measured values are used as the control constants for a speed sensorless vector control. Further, the resistances $r_1$, $r_2$, and a self-inductance $L_1$, which are control constants, can be obtained based on the component in a primary voltage vector direction of a primary current vector Iq' and the component π/2 delayed from the primary voltage vector direction of the primary current vector Id'. In this way, the characteristic constants can be accurately measured without any inverter output voltage sensor.

8 Claims, 10 Drawing Sheets

FIG. 5B

| | SWITCHING MODE | GUP = 0 GVP = 0 | GUP = 1 GVP = 0 | GUP = 0 GVP = 1 | GUP = 1 GVP = 1 |
|---|---|---|---|---|---|
| iu=POSITIVE iv=iw (=NEGATIVE) | U PHASE WINDING TERMINAL VOLTAGE | $-\frac{Vdc}{2} - \Delta Vd$ | $\frac{Vdc}{2} - \Delta Vt$ | $-\frac{Vdc}{2} - \Delta Vd$ | $\frac{Vdc}{2} - \Delta Vt$ |
| | V PHASE WINDING TERMINAL VOLTAGE | $-\frac{Vdc}{2} + \Delta Vt$ | $-\frac{Vdc}{2} + \Delta Vt$ | $\frac{Vdc}{2} + \Delta Vd$ | $\frac{Vdc}{2} + \Delta Vd$ |
| | TERMINAL VOLTAGE BETWEEN U-V | $-(\Delta Vd + \Delta Vt)$ | $Vdc - 2\Delta Vt$ | $-Vdc - 2\Delta Vd$ | $-(\Delta Vt + \Delta Vd)$ |
| | ERROR VOLTAGE BETWEEN U-V | $-(\Delta Vd + \Delta Vt)$ | $-2\Delta Vt$ | $-2\Delta Vd$ | $-(\Delta Vt + \Delta Vd)$ |
| iu=NEGATIVE iv=iw (=POSITIVE) | U PHASE WINDING TERMINAL VOLTAGE | $-\frac{Vdc}{2} + \Delta Vt$ | $\frac{Vdc}{2} + \Delta Vd$ | $-\frac{Vdc}{2} + \Delta Vt$ | $\frac{Vdc}{2} + \Delta Vd$ |
| | V PHASE WINDING TERMINAL VOLTAGE | $-\frac{Vdc}{2} - \Delta Vd$ | $-\frac{Vdc}{2} - \Delta Vd$ | $\frac{Vdc}{2} - \Delta Vt$ | $\frac{Vdc}{2} - \Delta Vt$ |
| | TERMINAL VOLTAGE BETWEEN U-V | $(\Delta Vt + \Delta Vd)$ | $Vdc + 2\Delta Vd$ | $-Vdc + 2\Delta Vt$ | $(\Delta Vd + \Delta Vt)$ |
| | ERROR VOLTAGE BETWEEN U-V | $(\Delta Vt + \Delta Vd)$ | $2\Delta Vd$ | $2\Delta Vt$ | $(\Delta Vd + \Delta Vt)$ |

METHOD FOR MEASURING CHARACTERISTIC CONSTANTS OF ALTERNATING CURRENT MOTOR AND CONTROLLER THEREOF BASED ON SAID METHOD

BACKGROUND OF THE PRESENT INVENTION

The present invention relates to a method for measuring characteristic constants of an alternating current motor, such as a three phase induction motor, said constants being at least one of a primary and secondary combined leakage inductance $(l_1+l_2)$, resistances $r_1$, $r_2$, a combined resistance $(r_1+r_2)$ thereof, and a self-inductance $L_1$, which constants are used as control constants for a speed sensorless vector control of the motor by using a voltage command value of an inverter apparatus for controlling the speed of the motor.

Generally, it has been required for the inverter or the like used for variable speed control of an induction motor to provide an improved high torque starting and speed control characteristic at a low speed. In order to meet this requirement, sensorless vector control has come into wide use in which speed control is carried out without using any speed sensor, nor any terminal voltage sensor of a motor, by controlling the induced voltage Em of an induction motor to keep it constant and by making the slip frequency proportional to the torque current thereof.

In order to maintain a constant induced voltage Em in such a control system, it is required to determine the primary voltage by compensating a voltage drop in an impedance on the primary side and to set up the motor constants, primary resistance $r_1$ and leakage inductance $(l_1+l_2)$. In order to calculate a slip frequency command, a secondary resistance $r_2$ is needed to be set up by reducing a measured value $r_1$ from a measured value $(r_1+r_2)$.

Further, a generalized inverter may be required as a load to drive a motor, domestic- or foreign-made, the motor constants of which are not known. In this case, before normal operation, the motor constants are measured by using an inverter, and the constants are established as control constants, after which the motor is operated with sensorless vector control. Such a method of measuring the primary and secondary combined leakage inductance $(l_1+l_2)$ and the primary and secondary combined resistance $(r_1+r_2)$ is described, for example, in Japanese Patent Laid-open No. 60-183953 (1985).

Therein, an alternating current motor is energized by three-phase excitation under the stopped state of the motor (primary frequency= slip frequency ) by using a three-phase inverter, and then the values $(l_1+l_2)$ and $(r_1+r_2)$ are calculatingly measured from an output of an inverter output voltage detector and a detected value of the motor current.

Since this method needs an inverter output voltage sensor, the method is difficult to apply to a generalized inverter which does not have any voltage sensor. Further, when the inverter output voltage is increased under a low load operation, the motor begins to rotate due to the three-phase excitation, which creates a problem of preventing the measurement of the constants. In order to avoid this problem, there is a method where the motor constants are calculatingly measured from a detected inverter output voltage and a detected motor current when the motor is energized with single-phase excitation in order to prevent motor rotation, which method has been disclosed in the report, "An automatic measurement of motor constants for speed sensorless vector control: 1992 National Convention Record I.E.E. Japan, No. 619".

In this method, the fundamental wave components of voltage Va and Vb are obtained by means of the general Fourier transform, since the inverter output voltage is an alternating voltage formed of a pulse width modulation voltage. Similarly, the fundamental wave components of current Ia and Ib are obtained by means of Fourier transform. In this case, the detection errors in Va and Vb may depend on the sampling frequency of the input voltage, since the inverter output voltage is a pulse width modulation voltage. Therefore, the values Va, Vb, Ia and Ib are detected 256 times for each value and $(l_1+l_2)$ and $(r_1+r_2)$ are calculatingly measured based on each of these average values.

This method may be accurate, since the actual fundamental wave voltage of the pulse width modulation applied to the motor is detected. However, the method also needs an inverter output voltage sensor like the former method described above, which leads to high cost. Further, since the fundamental wave voltage and current are obtained by means of Fourier transform, the accuracy in detected values may vary depending on the sampling frequency. Since the sampling cycle should be short in order to improve accuracy, a comparatively high speed microprocessing unit may be required to perform the necessary alternating excitation operation and calculating operations for Va, Vb, Ia and Ib in every cycle. Furthermore, since each of the values Va, Vb, Ia and Ib is obtained through averaging 256 detected values, the measurement takes, for example, 0.02 second×256= approximately 5 seconds when the alternating current excitation is performed with a primary frequency $f_1$=50 Hz, which causes a disadvantage in that the measuring time is disadvantageously long.

A previous method of measuring a primary self-inductance $L_1(=M+l_1)$, which is one of various measuring constants of a motor, is calculatingly measured from a motor terminal voltage and a non-load current under a normal operating condition of the sole motor (non-load condition ) as described in the above referenced 1992 National Convention Record.

The conventional method of measuring a primary self-inductance $L_1$ described above has disadvantages in that is not capable of carrying out the measuring under a load condition. Therefore, in a case where a generalized inverter is connected with various loads, there are disadvantages measuring the constant.

On the other hand, a method of measuring a primary self-inductance under a load condition is described in Japanese Patent Laid-open No. 61-92185 (1986). According to this method wherein a motor has a motor terminal voltage detector, the primary self-inductance is calculatingly measured from an output of the motor terminal voltage detector and a detected motor current under the condition of controlling the primary frequency such that, by detecting an induced voltage vector, the direction of the secondary inter-linkage magnetic flux of the vector may result in zero.

Although the conventional method described above is capable of measuring the primary self-inductance under a load condition, the method requires that the measurement take place under a condition where the direction of the secondary inter-linkage magnetic flux component of the induced voltage vector is determined. In order to detect the magnetic flux direction component, it is required to detect the motor terminal voltage in an alternating current state and to convert the three-phase alternating current into direct current for measurement. Therefore, there are disadvantages in that it is not possible to measure a primary self-inductance in a case of using a generalized inverter without voltage detectors in the output side of the inverter.

SUMMARY OF THE PRESENT INVENTION

The present invention is directed to the general objective of overcoming the above-mentioned problems which are inherent in conventional methods. An object of the present invention is to provide a method on calculatingly measuring, with high accuracy, at least one of a primary and secondary combined leakage inductance $(l_1+l_2)$, resistances $r_1$, $r_2$, a combined resistance $(r_1+r_2)$ thereof, and self-inductance $L_1$, which constants are used as control constants for the speed sensorless vector control of a motor without using any voltage detector for detecting an output voltage of the inverter. Another object of the present invention is to provide a method of measuring the values of the constants in a short time by using a low speed and low cost single-chip microprocessor.

The objects of the present invention can be attained by providing a method wherein an induction motor is energized by a single-phase alternating current excitation using an inverter without any inverter output voltage sensor, and characteristic constants, such as $r_1$, $r_2$, $(r_1+r_2)$, $(l_1+l_2)$, or $L_1$ are calculatingly measured based on the magnitude of an alternating current voltage command $Vc_1$, an active power component of current Iq and a reactive power component of current Id.

A single-phase alternating current excitation is performed using a method wherein an identical pulse signal is supplied to the V-phase and the W-phase, and a sine wave modulated pulse width modulation signal is supplied only to the U-phase. In order to improve the measuring accuracy, the actual output voltage of the inverter is needed to accurately correspond to the same voltage as the inverter output voltage command, since the inverter is of an inverter output voltage sensorless type. Therefore, the system is composed so that any voltage error may be corrected by use of the dead time which is provided to avoid short-circuit of the positive- and negative-arms of power elements. In addition to this, the alternating current excitation voltage itself is comparatively small even when the rated current flows, since the values $(r_1+r_2)$ and $(l_1+l_2)$ are measured under a condition of the induction motor of slip one (rotationally stopped state), so that the impedance of the secondary circuit of the induction motor is small. For this reason, the ON-state voltage drop in the power elements is not negligible. Therefore, the system is composed so that the pulse width may be corrected depending on the current polarity in the U-phase of the motor by the sum of the output voltage error caused by the dead time and the output voltage error caused by the ON-state voltage drop in the power elements.

Here, both the active power component of current Iq and the reactive power component of current Id are calculated in such a manner that, providing θ as the rotational phase of the alternating current excitation voltage vector against a fixed coordinate axis and iu as the detected instantaneous current on the sine wave modulated phase, the active power component of current Iq is obtained by averaging the value of integration of sinθ·iu over the interval of one cycle of the primary frequency, and the reactive power component of current Id is obtained by averaging the value of integration of −cosθ·iu over the interval of one cycle of the primary frequency.

Furthermore, the inverter is operated based on a primary angular frequency command $\omega_1$ and a primary voltage command $Vc_1$ to operate an alternating current motor in a normal condition. In this condition, the component of the inverter primary voltage vector direction of the motor current vector $I_1$ (active power component of current Iq') and the 90° delayed component of the inverter primary voltage vector direction of the motor current vector (reactive power component of current Id') are calculated from the phase obtained by integrating the primary angular frequency command and the measured current in the alternating current motor, and then a primary self-inductance $L_1$ of the motor is calculatingly measured based on the primary angular frequency command $\omega_1$, the primary voltage command $Vc_1$ (or the detected primary voltage $V_1$), the active power component of current Iq' and the reactive power component of current Id'. A practical equation to be used for the calculating measurement will be explained later.

Firstly, both the V-phase and the W-phase are of zero Volt potential, since the terminal voltage on the positive side (+Vdc/2 Volt) and the terminal voltage on the negative side (−Vdc/2 Volt) of the inverter input voltage Vdc are applied when an identical pulse signal having the conduction rate of ½ is applied to the V-phase and the W-phase. On the other hand, by performing a sine wave modulation on the U-phase, a single-phase voltage having a nearly sine wave is applied between the U-VW phases of the motor and the current in the motor flows under a stopped state (slip=1) of the motor. Therein, since the impedance of the circuit on the secondary side is small under the state of slip=1, as understood from an equivalent circuit, the current flowing in the mutual inductance is small enough to be able to approximate an open condition. And, the V-phase and the W-phase are connected in parallel, which is equivalent to a series circuit of a resistance $1.5(r_1+r_2)$ and a leakage inductance $1.5(l_1+l_2)$, whereon an alternating current is applied. Further, as the impedance of the motor winding is small under the state of slip=1, the rated current flows when the alternating current excitation voltage is comparatively small.

Next, when the current in the U-phase of the motor is positive, a negative voltage error takes place in the U-phase due to the dead time and the ON-state voltage drop in the elements. On the other hand, at this time, positive voltage errors take place in both the V-phase and the W-phase, since the current in the V-phase and the W-phase are negative. Therefore, the inverter is operated under a condition where the U-phase has a wider pulse width than the pulse width of the fundamental pulse width modulation signal by the magnitude of the negative voltage error (output voltage is increased), and the V-phase and the W-phase have a narrower pulse width than the pulse width of the ½ conduction rate by the magnitude of the positive errors (output voltage is decreased). Incidentally, as the opposite phenomena takes place when the current in the U-phase of the motor is negative, a correction is performed so as to narrow the pulse width in the U-phase and to widen the pulse width in the V-phase and the W-phase. As a result, the magnitude of the actual inverter output voltage (voltage between the terminals U-VW of the motor) becomes approximately equal to the magnitude of the alternating current excitation voltage command $Vc_1$.

Further, the active power of the motor is the averaged value for the integration of the product of the instantaneous alternating current excitation voltage $v_1$ and the instantaneous current on the U-phase $i_u$ over a one-cycle interval of the primary frequency. Therein, the instantaneous power $v_1 \cdot i_u$ is composed of only the component of the fundamental wave, since the value $v_1$ is approximately a sine wave voltage and is composed of only the component of the fundamental wave due to the correction of the dead time, though the value $i_u$ is of a distorted wave due to the single-phase excitation. Therefore, the active power component of current Iq is obtained by dividing the active power by the magnitude of the excitation voltage $V_1$. More specifically, the current Iq may be determined with a method wherein the values of $\sin\theta \cdot i_u$, providing $\theta$ as the rotational phase command for the excitation voltage vector against the fixed coordinate axis, are sampled and accumulated using an arbitrary sampling frequency within a one-cycle interval of the primary frequency, and then the accumulated value is divided by the number of the accumulated samples. On the other hand, the reactive power component of current Id is obtained by means of dividing the reactive power by the value $V_1$. More specifically, the current Id may be obtained using a method wherein the values of $-\cos\theta \cdot i_u$ are sampled and accumulated and the accumulated value is divided by the number of the accumulated samples.

Thus, $(r_1+r_2)$ is calculated from the ratio of $Vc_1 \cdot Iq$ and $(Id^2+Iq^2)$, and $(l_1+l_2)$ is calculated from the ratio of $Vc_1 \cdot Id$ and $\omega(Id^2+Iq^2)$. As described above, the values $(r_1+r_2)$ and $(l_1+l_2)$ are accurately measured with an inverter without an output voltage sensor, since the magnitude of the actual inverter output voltage $V_1$ (the voltage between the terminals U-VW of a motor) is nearly equal to the magnitude of the excitation voltage command $Vc_1$, and the values of Id and Iq are based on the component of the fundamental wave.

Next, for purposes of calculatingly measuring the primary self-inductance $L_1$, the motor is accelerated by the inverter with a $V_1/f_1$-constant control in which the ratio of the primary voltage $V_1$ and the primary frequency $f_1$ is kept constant, and then the motor is operated in the normal operation condition near a rated frequency. Under these conditions, a pulse width modulation signal of the inverter is directly output based on the phase of the primary voltage vector obtained by integrating the primary frequency command, and the primary current vector $I_1$ is converted from a three phase current to a direct current based on the primary voltage vector. Therein, the primary voltage is directly output based on the phase of the primary voltage vector, and the component of the primary voltage vector direction of the primary current vector $I_1$ (active power component of current Iq') and the component having a 90° delayed direction from the primary voltage vector direction of the primary current vector (reactive power component of current Id') are obtained from the phase, which leads to detecting the accurate values of Iq' and Id' without being influenced by the internal impedance of the motor. Further, the primary self-inductance $L_1$ is calculated from an equation based on the a voltage versus current diagram of the induction motor under normal operation. In this case, although Iq' and Id' vary depending on the load, $L_1$ can accurately be measured without regard to the load, since calculating measuring can be performed based on accurate values of Iq' and Id'.

BRIEF DESCRIPTION OF THE DRAWINGS

FIGS. 5A and 5B are a circuit diagram and a chart, respectively, for explaining the cause of voltage error by the ON-state voltage drop described with reference to FIG. 3.

DETAILED DESCRIPTION OF THE PREFERRED EMBODIMENTS

Figure 1:
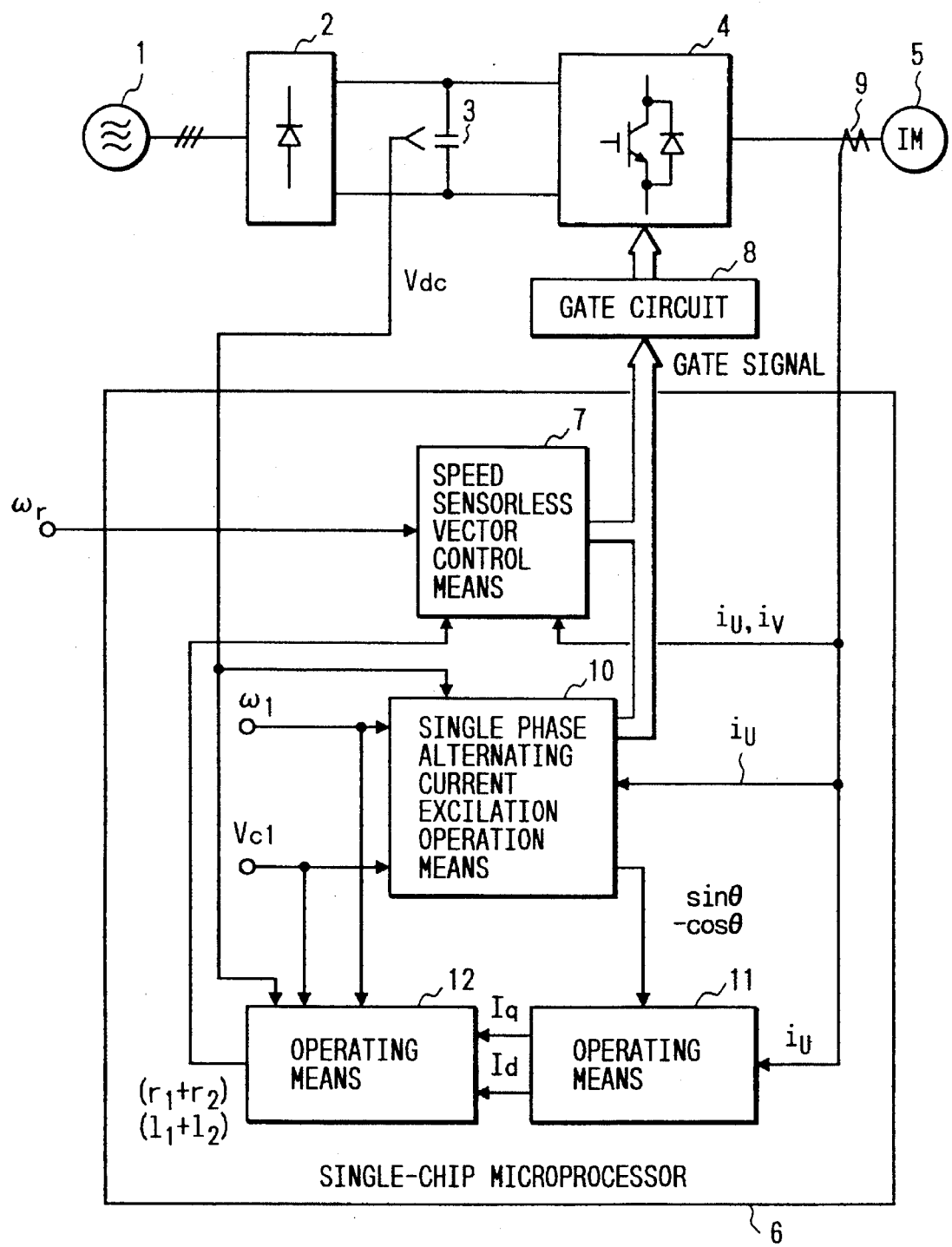
FIG. 1 is a block diagram showing one embodiment in accordance with the present invention.

The present invention will be described in detail with reference to the accompanying drawings. In FIG. 1, the power from an alternating current power supply 1 is converted into direct current through a rectifier circuit 2 and a smoothing capacitor 3. In a normal operation, an alternating voltage is generated by controlling the inverter input voltage Vdc with a pulse width modulation control using an inverter 4, so that induction motor 5 is controlled to produce variable speed control. In a normal operation, a speed sensorless vector control is performed by a control circuit 6 of a single-chip microprocessor so as to follow a speed command $\omega_r$ and generate pulse width modulation signals in a gate circuit 8. In the circuit 6, the control is generally carried out based on a primary resistance setting value or a measured value $r_1$, a measured combined resistance $(r_1+r_2)$, a measured combined leakage inductance $(l_1+l_2)$, the other motor constant setting values and an output of the motor current detector 9. In the speed sensorless vector control operation, a primary voltage command for the motor is output with correction of the voltage drop by the impedance on the primary side such that the induced voltage of the induction motor Em is basically kept constant. Further, the speed control is preformed by providing a slip frequency proportional to the current contributing to the torque, and the pulse width modulation signals are output based on the magnitude of a primary voltage vector and a frequency command. In such a speed control, a method of and an apparatus for measuring a primary and secondary combined resistance and a combined leakage inductance, which are the main part of the present invention, will be described below. Before the normal operation, the values $(r_1+r_2)$ and $(r_1+l_2)$ are measured by using the inverter 4 in order to use the constants as motor constants for the speed sensorless vector control. Firstly, a sine wave modulation signal is generated by a single-phase alternating current excitation operation means 10 to operate the inverter 4 through the gate circuit 8, and then the alternating current is supplied to the motor 5 with an alternating excitation voltage. In an operating means 11 for calculating an active power component of the current Iq and a reactive power component of the current Id, the values Iq and Id are calculated, as explained later, based on $\sin\theta$, $-\cos\theta$ and current $i_u$ flowing in the U-phase of the motor 5, detected when excited by the single-phase alternating current, providing $\theta$ as the rotational phase of the alternating current excitation voltage vector obtained by integrating the primary frequency command $\omega_1$. Next, in an operating means 12 for calculating primary and secondary combined resistance and combined leakage inductance, the values $(r_1+r_2)$ and $(l_1+l_2)$ are calculated, as explained later, from calculated values of Iq and Id and the magnitude of an excitation voltage command $Vc_1$ to use these values as the control constants for the speed sensorless vector control means 7. Here, the secondary resistance $r_2$ is obtained by setting $l_1=l_2=(l_1+l_2)/2$, as generally known, using the primary resistance $r_1$ measured in advance or preset and the measured value $(r_1+r_2)$, and subtracting $r_1$ therefrom.

Figure 2:
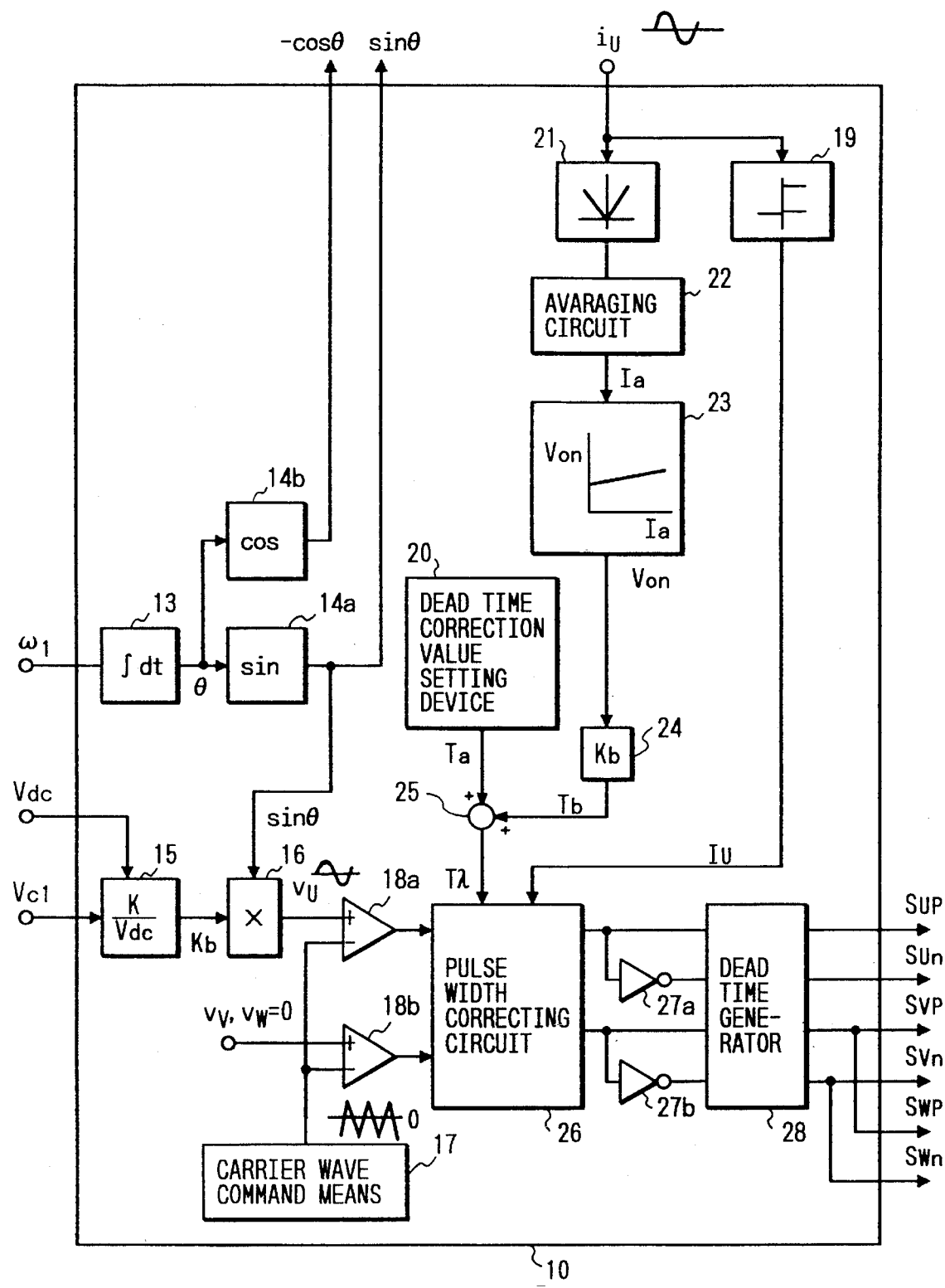
FIG. 2 is a block diagram of the single-phase alternating current excitation operation means 10 shown in FIG. 1.

A method for effecting a single-phase alternating current excitation will be described below. FIG. 2 shows details of the single-phase alternating current excitation operation means 10. The primary frequency command $\omega_1$ is integrated, by an integrating operation means 13, the output of which is taken as the rotational phase $\theta$ for the alternating current excitation voltage vector. And, $\sin\theta$ is generated in a sin function means 14a and $-\cos\theta$ is generated in a $-\cos$ function means 14b. The magnitude of the alternating current excitation voltage command (root mean square value $Vc_1$) is divided by an inverter input voltage Vdc in a dividing operation means 15 to produce the magnitude of a modulation wave command (ratio of the peak value of a modulation wave against the peak value of a carrier wave) Kh, which is multiplied by $\sin\theta$ to produce a modulating signal vu, having a sine wave shape. Therein, there is a relation Kh $=2.83 \cdot Vc_1/Vdc$ because of sine wave modulation. The value of vu is compared with the output of a carrier wave command means 17 supplied to a comparing operation means 18a to produce a sine wave pulse width modulation signal. On the other hand, the V-phase and the W-phase are compared with the zero-modulation wave supplied to a comparing operation means 18b to produce a pulse width signal having the conduction rate of ½.

A current polarity discrimination operation means 19 outputs a signal IV indicating the polarity of the motor current iu. The average value of iu, that is Ia, is produced by an absolute value operation means 21 and an averaging operation means 22, which produces the magnitude of an ON-state voltage drop Von of the power elements through an ON-state voltage calculating operation means 23. A pulse width Tb corresponding to the ON-state voltage drop of the power elements is calculated through a means 24 having a gain $k_b$. Therein, when the inverter voltage Vdc largely fluctuates, the value of Tb is corrected by dividing it by Vdc. The output Ta from a dead time correction value setting device 20 is determined according to the following equation.

$$Ta=Td+Ton-Toff \quad (1)$$

Where, Td is a dead time provided to prevent short-circuit between positive- and negative-arms of the power elements. Ton is an actuation delay time for turn-on of both the gate circuit 8 and the power elements. Toff is an actuation delay time for turn-off of both the gate circuit and the power elements. A pulse width correcting operation means 26 corrects the pulse width outputs from the comparing operation means 18a and 18b by the pulse width correction T$\lambda$ which is the sum of Ta and Tb. Therein, a negative voltage error is produced in the U-phase when iu is positive due to the dead time and the ON-state voltage drop of the power elements, and positive voltage errors are produced in both the V-phase and the W-phase due to the negative motor current. Therefore, the pulse width in the fundamental pulse width modulation signal for the U-phase is widened by the pulse width correction T$\lambda$ (increasing output voltage), and the pulse widths in the conduction rate of 1/2 for the V-phase and the W-phase are narrowed by the magnitude of T$\lambda$ (decreasing output voltage). On the other hand, when the motor current in the U-phase is negative, the pulse width in the U-phase is narrowed and the pulse widths in the V-phase and the W-phase are widened due to the reversal phenomena described above. The output of the pulse width correcting operation means 26 produces a three-phase gate circuit input signal through inverting operation means 27a and 27b and a dead time generating operation means 28. The operation means described above may be provided with the software of the single-chip microprocessor 6. Furthermore, the sine function means and the like may be formulated in an internal read-only memory, and the operation means to generate the pulse width modulating signal may be provided by an internal timer.

Figure 3:
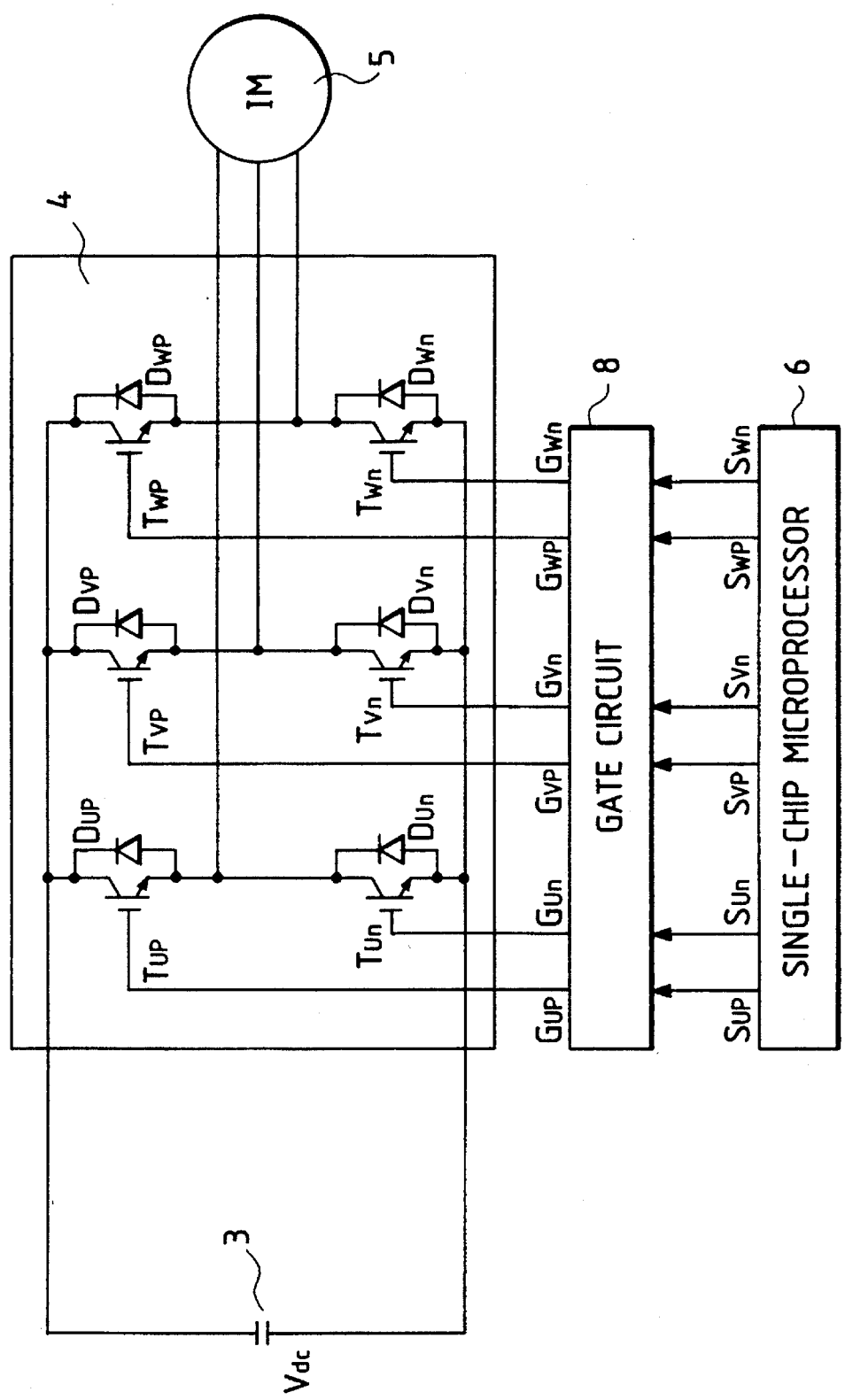
FIG. 3 is a diagram of a portion of FIG. 1 including details of the inverter 4.

FIG. 3 shows details of the main circuit of the inverter 4. The value Ton described by the equation 1 is the actuation delay time from the time when the gate circuit input signal Sup is switched from OFF to ON to the time when the transistor which forms the power element is switched on. And, Toff is the actuation delay time from the time when the gate circuit input signal Sup is switched from ON to OFF to the time when the transistor Tup which forms the power element is switched off.

Figure 4:
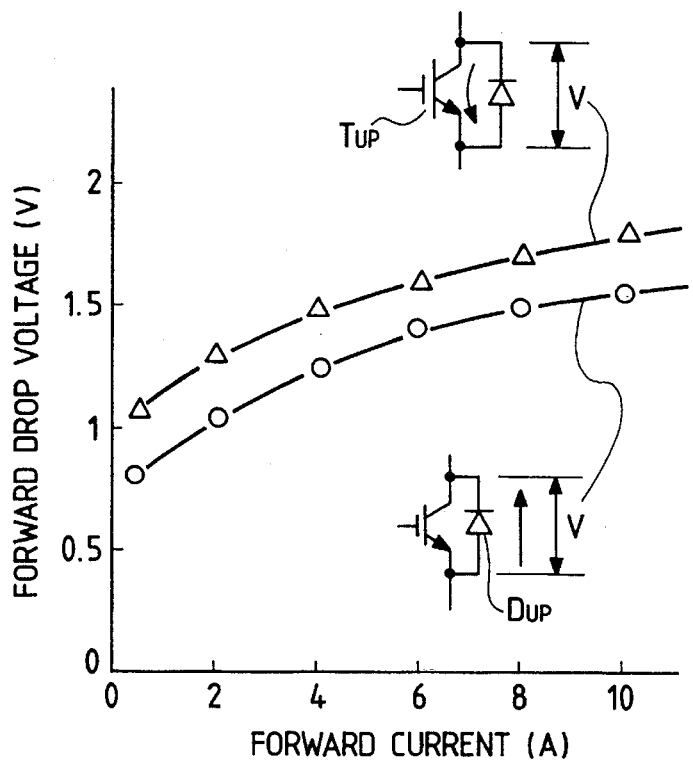
FIG. 4 is a graph explaining the ON-state voltage drop in a power element shown in FIG. 3.
Figure 5A:
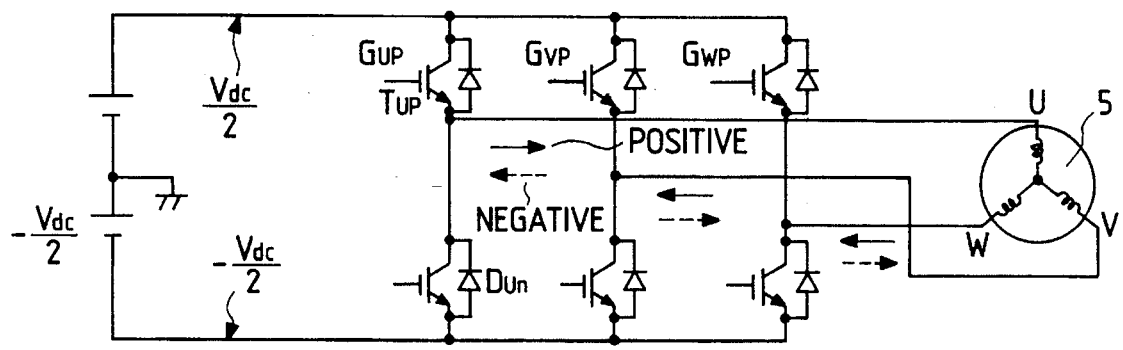

FIG. 4 shows an example of forward voltage drop characteristics versus forward currents for a transistor Tup and a reflux diode Dup which form the power element. FIG. 5A and 5B are diagrams for explaining the inverter output voltage drop due to the ON-state voltage drop. The voltage in the positive arm terminal is +Vdc/2 and the voltage in the negative arm terminal is $-$Vdc/2, providing the inverter input voltage as Vdc. Therein, since the V-phase and W-phase have identical signals, there are four kinds of combinations of the switching modes as described in FIGS. 5A and 5B. When iu is positive and Gup=0, the current iu flows through the diode Dun. And, when Gup=1, iu flows through the transistor Tup. Therein, approximating that the voltage drop in the diode $\Delta$Vd nearly equals the voltage drop in the transistor $\Delta$Vt, as described in FIG. 4, the error voltage in the actual voltage of the motor winding terminal for the U-phase against the magnitude of the voltage command is approximately $-(\Delta Vd+\Delta Vt)/2$. On the contrary, when iu is negative, the error voltage in the actual voltage of the motor winding terminal for the U-phase against the magnitude of the voltage command is approximately $+(\Delta Vd+\Delta Vt)$. In the ON-state voltage calculating operation 23 in FIG. 2, Von= $(\Delta Vd+\Delta Vt)/2$ is obtained from a function table or an approximation equation corresponding to the magnitude of iu based on the characteristic described in FIG. 4. The magnitude of the pulse width correction corresponding to Von is obtained from the following equation.

$$Tb=Tc \cdot Von/Vdc \quad (2)$$

where Tc is the carrier wave cycle from a carrier wave command 17.

Figure 6:
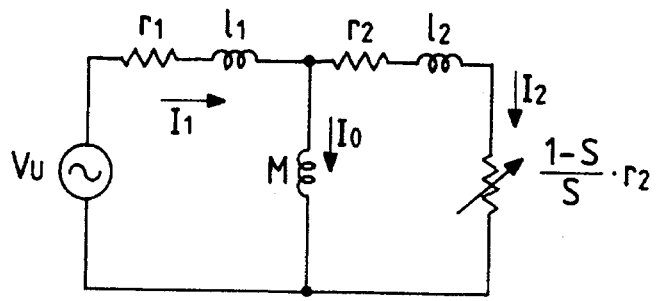
FIG. 6 is an equivalent circuit diagram for one phase portion of the induction motor 5 shown in FIG. 1.
Figure 7:
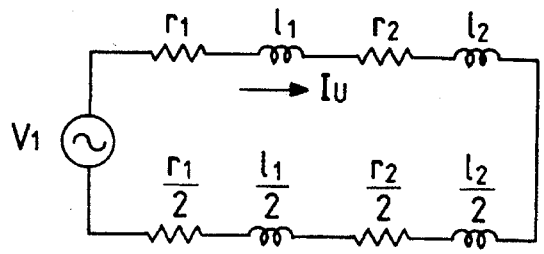
FIG. 7 is an equivalent circuit diagram of the motor 5 in a state of single phase alternating current excitation in accordance with the present invention.
Figure 8:
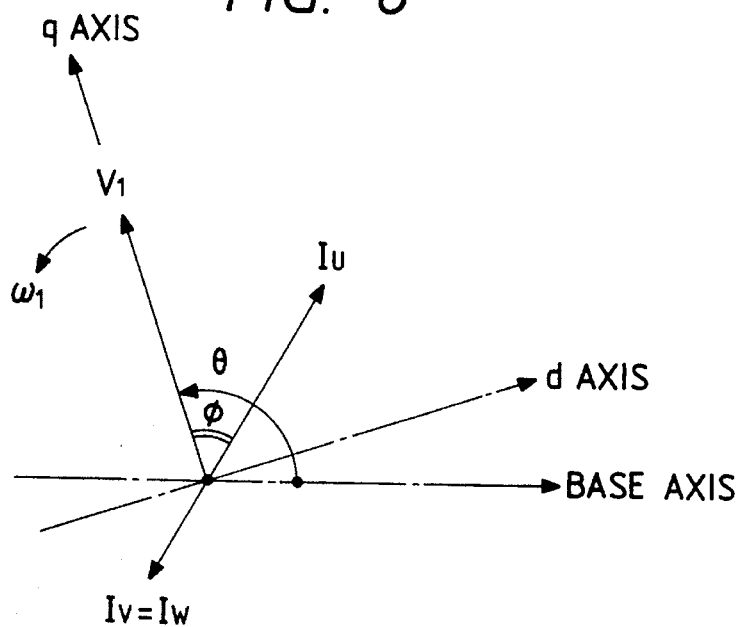
FIG. 8 is a voltage- and current-vector diagram in a state of single phase alternating current excitation in accordance with the present invention.

Referring now to FIG. 6, FIG. 7 and FIG. 8, the calculating operation for an active power component of the current Iq and a reactive power component of the current Id 11, and the calculating operation for primary and secondary combined resistance and combined leakage inductance 12, will be described below in detail. FIG. 6 shows an equivalent circuit for the portion of one phase of the induction motor. When the slip s=1, where the impedance induced by the secondary resistance $r_2$ and the secondary leakage inductance $l_2$ is small, the mutual inductance M may be approximated as an open state. Since the motor windings of the V-phase and the W-phase are connected in parallel and receive an identical signal, the equivalent circuit between the U-VW phases becomes as shown in FIG. 7. The inverter output voltage $V_1$ (alternating excitation voltage) is applied thereto. Therein, $(r_1+r_2)$ is the value of the active power Pq divided by the square of the root-mean-square value of the current in the U-phase of the motor ($Iu^2$) and is given by the following equation:

$$(r_1+r_2)=V_1 \cdot Iu \cdot \cos\phi/(1.5 \cdot Iu^2) \qquad (3)$$

where, $\phi$ is the power factor angle described in FIG. 8. The combined leakage inductance $(l_1+l_2)$ is the value of the reactive power Pd divided by the square of the root-mean-square value of the current in the U-phase of the motor ($Iu^2$) and is given by the following equation:

$$(l_1+l_2)=V_1 \cdot Iu \cdot \sin\phi/(1.5\omega_1 \cdot Iu^2). \qquad (4)$$

The active power $Pq=V_1 \cdot Iu \cdot \cos\phi$ is the average value of the integration of the product of the instantaneous alternating current excitation voltage $v_1$ and the instantaneous current in the U-phase iu over the interval of one cycle of the primary frequency. Therein, though iu has a distorted wave shape due to the single phase excitation, $v_1$ with dead time correction is nearly a sine wave voltage and is composed of only one component of the fundamental wave. Therefore, the instantaneous power $v_1 \cdot iu$ is composed of only one component of the fundamental wave. The active power component of current $Iq=Iu \cdot \cos\phi$ is the average value of the integration of $1.414 \cdot \sin\phi \cdot iu$ over the interval of one cycle of the primary frequency, since $v_1=1.414 \cdot V_1 \cdot \sin\theta$. More specifically, Iq is obtained by sampling and accumulating $1.414 \cdot \sin\phi \cdot iu$ with an arbitrary sampling frequency within the interval of the primary frequency and by dividing the accumulated value by the number of the accumulated samples.

On the other hand, the reactive power $Pd=V_1 \cdot Iu \cdot \sin\phi$ is the average value of the integration of the product of the instantaneous voltage $-1.414 \cdot V_1 \cdot \cos\theta$, which is delayed by 90° with respect to the instantaneous alternating current excitation voltage $v_1$ and the instantaneous U-phase current iu. Therefore, the reactive power component of the current Id is the average value of the integration of $-1.414 \cdot \cos\theta$ over the interval of one cycle of the primary frequency. More specifically, Id is obtained by sampling and accumulating $-1.414 \cdot \cos\theta \cdot iu$ with an arbitrary sampling frequency within the interval of one cycle of the primary frequency and by dividing the accumulated value by the number of the accumulated samples.

Referring to FIG. 8, the d-axis component of Iu is Id and the q-axis component of Iu is Iq, and so $Iu^2=(Id^2+Iq^2)$ and the equations 3 and 4 can be written as follows:

$$(r_1+r_2)=Vc_1 \cdot Iq/1.5(Id^2+Iq^2) \qquad (5)$$

$$(l_1+l_2)=Vc_1 \cdot Id/1.5(Id^2+Iq^2) \qquad (6)$$

Figure 9A:
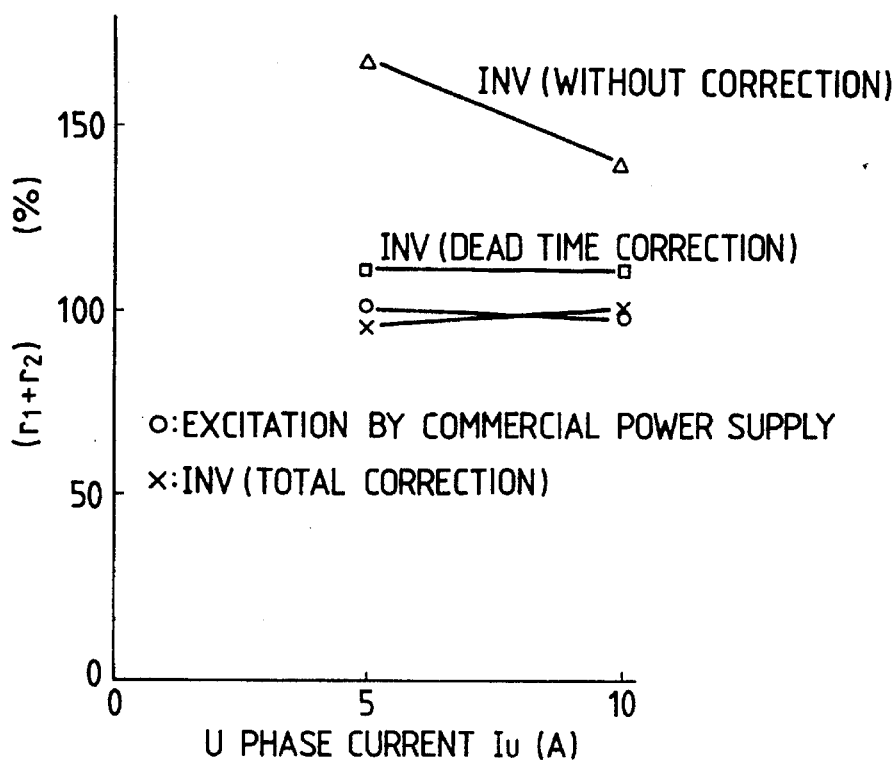
FIGS. 9A and 9B are graphs showing characteristic constants of the motor 5 obtained experimentally by means of a measuring method in accordance with the present invention.
Figure 9B:
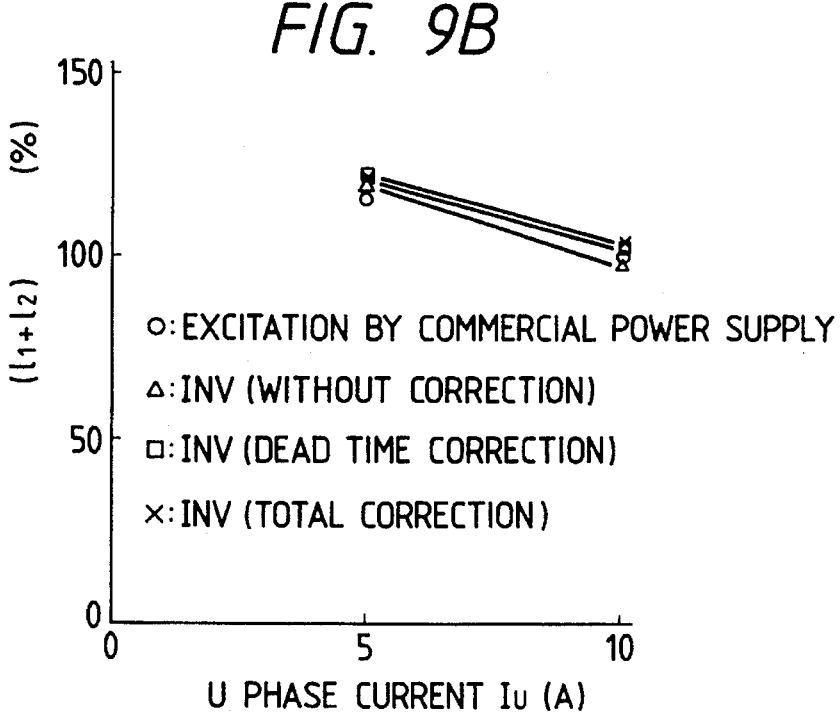

FIGS. 9A and 9B show some experimental results of a characteristic measurement by using the method according to the present invention. The characteristic has been obtained from a 2.2 kW induction motor using a 50 A rated IGBT inverter. By correcting the pulse width by the magnitude of the inverter output voltage errors due to the dead time and due to the ON-state voltage drop in the power elements corresponding to the motor current polarity, the magnitude of the actual inverter output voltage $V_1$ (voltage between the U-VW terminals of the motor) is approximately equal to the magnitude of the alternating current excitation voltage command $Vc_1$. In consequence, the combined leakage inductance $(l_1+l_2)$ and the combined resistance $(r_1+r_2)$ are capable of being calculated without using any inverter output voltage detector with the same level of high accuracy as in the measurement using the commercial electric power excitation. Further, there is another advantage in that it is possible to perform the measurement by use of a low calculating speed and low cost single chip microprocessor in a short time, since the active power component of current Iq and the reactive power component of current Id are calculated by an accumulating operation over the interval of one cycle of the primary frequency from the detected instantaneous current of the motor iu and the phase of alternating current excitation voltage vector $\theta$.

Figure 10:
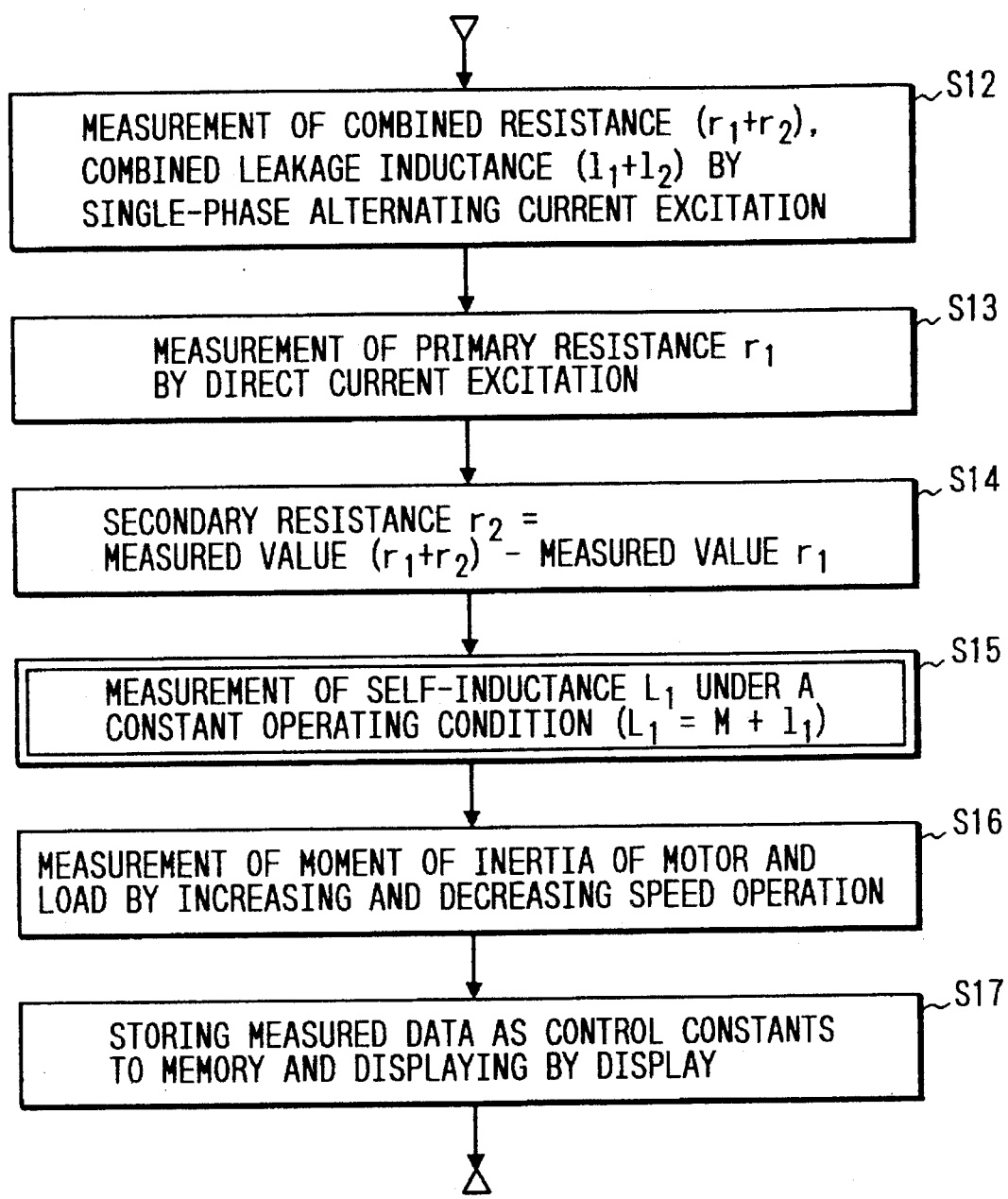
FIG. 10 is a flow chart of a method for obtaining further characteristic constants $r_1$, $r_2$, $L_1$ based on the constants $(r_1+r_2)$, $(l_1+l_2)$ in accordance with the present invention.

Next, FIG. 10 shows in more detail how to obtain the characteristic constants $r_1, r_2, L_1$. Firstly, by the single phase alternating current excitation method described above, a combined resistance $(r_1+r_2)$ and a combined leakage inductance $(l_1+l_2)$ are measured, as shown in step S12. Then, by the direct current excitation method, the primary resistance $r_1$ is measured, as shown in step S13. The measured value $r_2$ is obtained by subtracting the measured value $r_1$ from the measured value $(r_1+r_2)$ as shown in step S14. In addition to this, when the values of $(r_1+r_2)$ and $r_2$ are measured at a room temperature, these values need to be increased by 10% to 15% due to a temperature increase in the normal operation.

Next, the self-inductance $L_1$ ($L_1=M+l_1$) is measured under the normal operating condition, that is, during a constant speed and a constant frequency operation of the motor, as shown in step S15. By the operation of increasing and decreasing the speed of the motor, the moment of inertia of the motor and the load are measured, as shown in step S16. After that, these data are stored in the nonvolatile memory and displayed on the display, as shown in step S17, and are used thereafter to control the motor with high accuracy.

Figure 11:
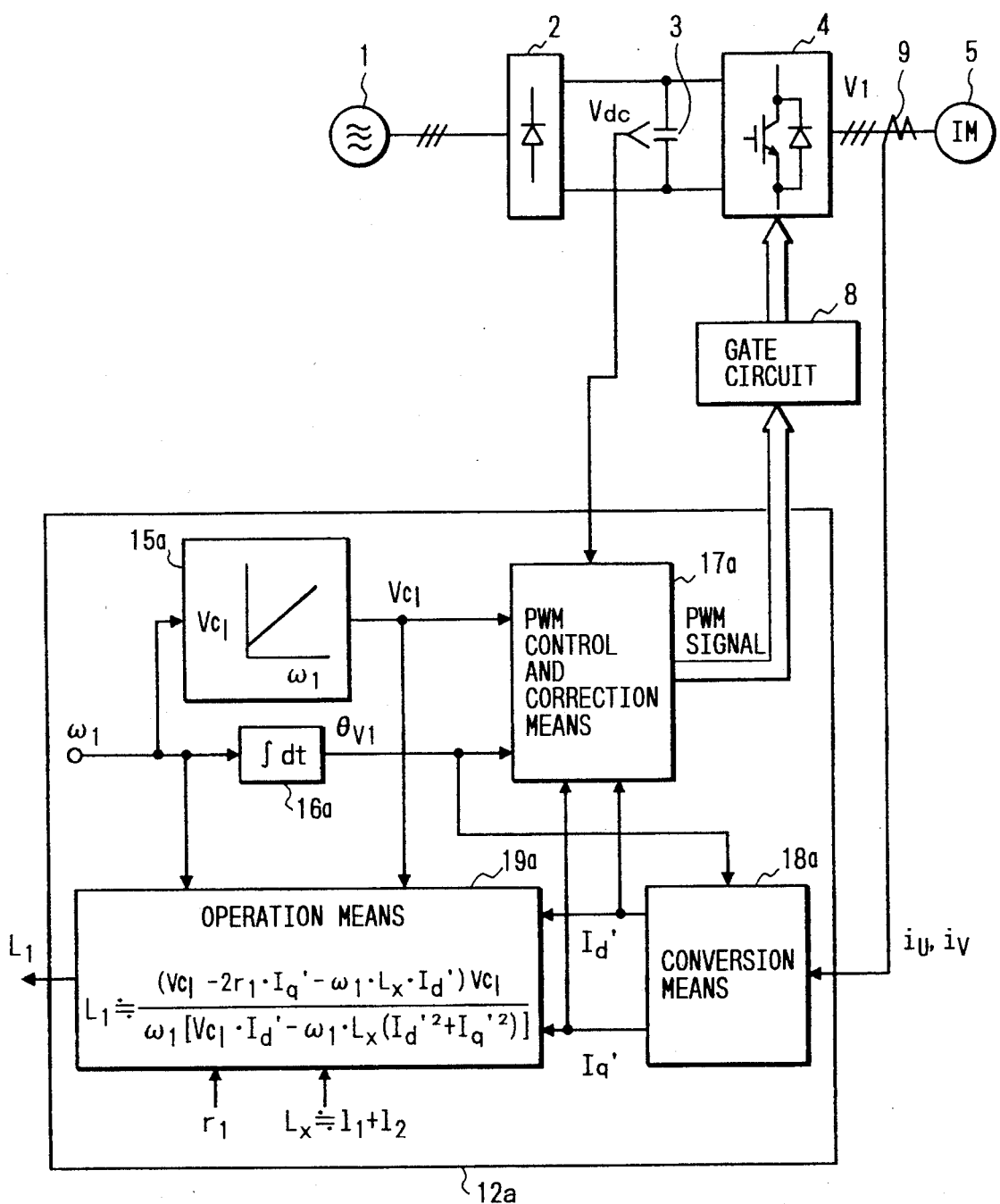
FIG. 11 is a block diagram showing an embodiment of an apparatus for obtaining further constants in accordance with the present invention.

Furthermore, a method of measuring the self-inductance $L_1$ will be described below. The block diagram in FIG. 11 having a $L_1$ calculating means 12a shows details of a construction which performs the measuring method for the self-inductance $L_1$, as shown in FIG. 10. A V/f-constant operation means 15a outputs a primary voltage command $Vc_1$ proportional to a primary angular frequency command $\omega_1$. An integrating operation means 16a produces a phase command $\theta_{v1}$ for a primary voltage vector by integrating $\omega_1$. A PWM control and correction means 17a outputs a pulse width modulation signal corresponding to the magnitude of the primary voltage command $Vc_1$ and the phase command $\theta_{v1}$ for the primary voltage vector, and carries out a normal operation near the rated frequency and near the rated magnetic flux (ratio of rated frequency and rated voltage). In the PWM control and correction means 17a, the pulse width is corrected depending on the fluctuation of the direct current voltage $V_{dc}$ such that the magnitude of the actual inverter output voltage $V_1$ will agree with the primary voltage command $Vc_1$. Further, the voltage error caused by the dead time which is provided to prevent a short circuit between the positive and negative arms of the inverter is also corrected corresponding to the polarity of the current of the motor. Next, a general three-phase alternating current/two-phase direct current conversion means 18a carries out the calculations of the equations 7 and 8, and obtains a reactive power component of current Id' and an active power component of current Iq'. Therein, $\theta d = \theta_{v1} - \pi/2$.

$$Id' = iu \cdot \sin\theta d/1.414 - (iu + 2\ iv)\cos\theta d/2.45 \quad (7)$$

$$Iq' = iu \cdot \cos\theta d/1.414 + (iu + 2\ iv)\sin\theta d/2.45 \quad (8)$$

Then, a self-inductance calculating operation means 19a calculates $L_1$ by using the following equation (9) based on the values Id' and Iq', the primary angular frequency command $\omega_1$, the primary voltage command $Vc_1$, and the primary resistance $r_1$ and the combined leakage inductance Lx ($Lx \approx l_1 + l_2$) which have previously been measured.

$$L_1 = \frac{(V_{C_1} - 2r_1 \cdot Iq' - \omega_1 \cdot Lx \cdot Id')V_{C_1} + r_1^2([Id']^2 + [Iq']^2)}{\omega_1[V_{C_1} \cdot Id' - \omega_1 \cdot Lx([Id']^2 + [Iq']^2)]} \quad (9)$$

$$\approx \frac{(V_{C_1} - 2r_1 \cdot Iq' - \omega_1 \cdot Lx \cdot Id')V_{C_1}}{\omega_1[V_{C_1} \cdot Id' - \omega_1 \cdot Lx([Id']^2 + [Iq']^2)]}$$

Therein, the magnitude of the actual inverter output voltage $V_1$ may be detected with a voltage sensor and used instead of the primary voltage command $Vc_1$.

Referring to a voltage-current vector diagram of FIG. 12, the derivation of equation (9) will be described below. Providing the q-axis is the direction of the primary voltage vector and the d-axis is the direction of $\pi/2$ delayed from the q-axis, the q-axis component of the primary current vector $I_1$ is the active power component of current Iq' and the d-component thereof is the reactive power component of current Id'. On the other hand, the component of the secondary inter-linkage magnetic flux direction, which is $\pi/2$ delayed from the induced voltage vector $E_m$, of the primary current vector, is the excitation component of the current $I_m$. Therefore, the induced voltage $E_m$ is generally given by the following equation (10), where M is the mutual inductance and $L_2 (= M + l_2)$ is the secondary self-inductance.

$$E_m = \omega_1 M^2 \cdot I_m/L_2 \quad (10)$$

Figure 12:
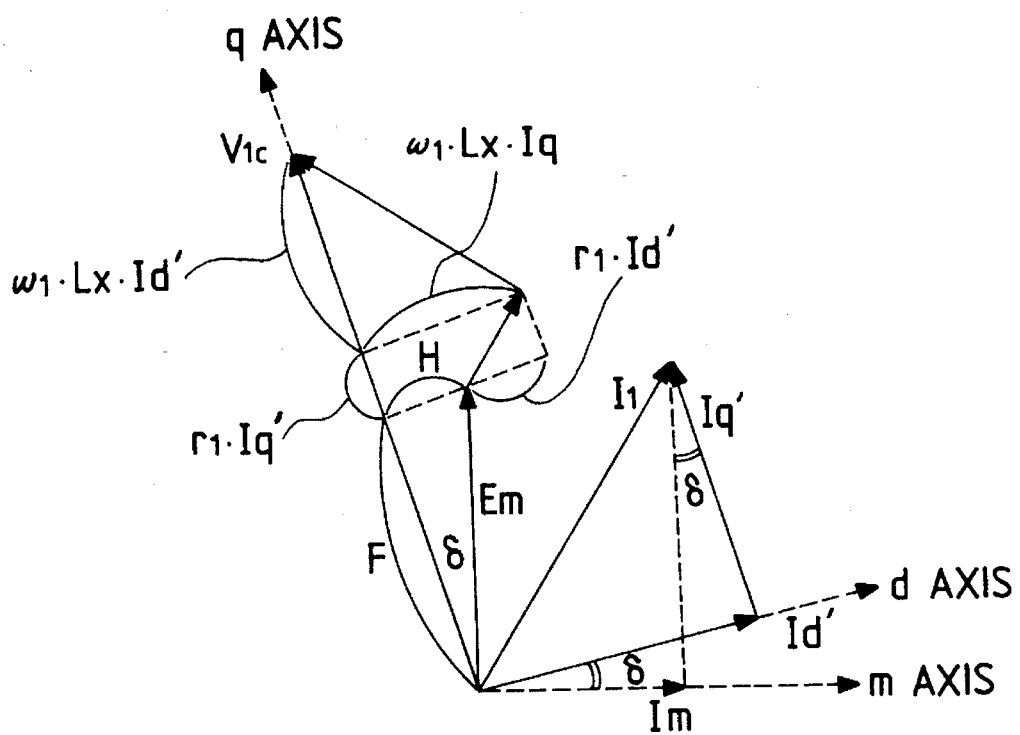
FIG. 12 is a voltage-current vector diagram of an induction motor 5 under normal loaded operation shown in FIG. 11.

The relation $I_m = (Id' \cdot \cos\delta - Iq' \cdot \sin\delta)$ is obtained from FIG. 12, then equation (10) becomes equation (11).

$$E_m = \omega_1 M^2 (Id' \cdot \cos\delta - Iq' \cdot \sin\delta)/L_2 \quad (11)$$

Further, providing H is the d-axis component of $E_m$ and F is the q-axis component of $E_m$, as referred to in FIG. 12, $E_m$ becomes equation (12) and equation (13) is obtained because the equation (11) = the equation (12).

$$E_m = F \cdot \cos\delta + H \cdot \sin\delta \quad (12)$$

$$F \cdot \cos\delta + H \cdot \sin\delta = \omega_1 M^2 (Id' \cdot \cos\delta - Iq' \cdot \sin\delta)/L_2 \quad (13)$$

Dividing both sides of the equation (13) by $\cos\delta$, substituting $\tan\delta = H/F$ and arranging, equation 14 is obtained.

$$F^2 + H^2 = \omega_1 M^2 (Id' \cdot F - Iq' \cdot H)/L_2 \quad (14)$$

Since the self-inductance $L_1 = Lx + M^2/L_2$, by obtaining $M^2/L_2$ from the equation (12) and substituting it in this equation, $L_1$ becomes equation (15).

$$L_1 = [F^2 + H^2 + \omega_1 Lx(Id' \cdot F - Iq' \cdot H)]/[\omega_1(Id' \cdot F - Iq' \cdot H)] \quad (15)$$

Referring to FIG. 12, $F = V_{1c} - \omega_1 Lx \cdot Id' - r_1 \cdot Iq'$ and $H = \omega_1 Lx \cdot Iq' - r_1 \cdot Id'$, and by substituting these relations into the equation (15) and arranging, then $L_1$ becomes as shown in equations (9). Therein, there is an advantage in that $L_1$ can be measured even at a load operation without any inverter output voltage sensor by means of using the equation (9) in the calculation though Id' and Iq' change as the load changes.

Further, Id' and Iq' are accurately calculated because of the pulse width modulation signal being output based on a phase $\theta_{v1}$ obtained by integrating the primary angular frequency command $\theta_1$, the current Iq' component in the primary voltage vector direction of the motor current vector $I_1$ and the Id', component in the 90° delayed direction thereof of the motor current vector, being directly obtained so as to be not affected by the errors in the internal impedance of the motor. As a result, there is an advantage in that $L_1$ can be accurately measured, since $L_1$ is calculated based on accurate values of Id' and Iq'.

According to the present invention, it is possible to calculate the combined leakage inductance $(l_1 + l_2)$ and the combined resistance $(r_1 + r_2)$ with high accuracy only from the magnitude of the excitation voltage command and the detected instantaneous current of the motor with correction of the inverter output voltage error due to the dead time and the ON-state voltage drop in power elements without using any inverter output voltage sensor. Further, it is possible to perform the calculation using measuring by use of a low calculating speed and low cost single-chip microprocessor in a short time, since the active power component of current and the reactive power component of current are calculatable in the interval of one cycle of the primary frequency from the phase of the excitation voltage vector command $\theta$ and the detected instantaneous current in the motor.

Further, in measuring the self inductance, the active power component of current Iq' and the reactive power component of current Id' can be accurately obtained without relation to the load by outputting an inverter output voltage based on the phase of the primary voltage vector and separating the primary current vector using the component in the primary voltage vector direction based on the phase. The self-inductance $L_1$ can accurately be measured without any inverter output voltage sensor and without regard to the magnitude of the load since $L_1$ is calculated based on Iq' and Id' and the primary voltage command $V_{1c}$ and so on.

We claim:

1. A method of measuring characteristic constants of a three-phase alternating current motor controlled by an inverter apparatus including a three-phase inverter for converting a direct current voltage into a three-phase alternating current so as to supply the three-phase alternating current to said three-phase motor and a controller for controlling the magnitude and pulse-width of an output voltage of said three-phase inverter, the method comprising the steps of:

producing single-phase alternating current excitation signals based on a primary frequency command value $\omega_1$ and a primary voltage command value $Vc_1$ for said three-phase inverter, and a detected current value of the three-phase motor;

controlling the three-phase inverter by single-phase alternating current excitation based on said single-phase alternating current excitation signals so as to output single-phase alternating current to the three-phase motor;

calculating an active power component of current Iq and a reactive power component of current Id for the three-phase motor based on a phase value obtained by integrating said primary frequency command and a detected current value of the three-phase motor controlled in the manner of the single-phase alternating current excitation; and measuring a combined resistance $(r_1+r_2)$ of primary resistance $r_1$ and secondary resistance $r_2$ of the three-phase motor by calculating a ratio of a value $Vc_1 \cdot Iq$ and a value $(Id^2+Iq^2)$, and a combined leakage inductance $(l_1+l_2)$ of primary leakage inductance 1 and secondary leakage inductance $l_2$ of the three-phase motor by calculating a ratio of a value $Vc_1 \cdot Id$ and a value $\omega_1 (Id^2+Iq^2)$.

2. A method of measuring characteristic constants of a three-phase alternating current motor, as defined in claim 1, wherein said single-phase alternating current excitation signals are produced by supplying pulse width modulation signals of a carrier wave command signal modulated by a sine wave to only one phase out of three phases of the three-phase motor and pulse width signals having a conduction rate which is 1/2 to the other two phases of the three-phase motor; and further including:

correcting the pulse width signals according to a pulse width $T\lambda$ depending on the current polarity of the motor, said pulse width $T\lambda$ corresponding to an inverter output voltage error due to a dead time required to prevent a short-circuit between positive- and negative arms of the inverter and an ON-state voltage drop in power semiconductor elements of the inverter.

3. A method of measuring characteristic constants of a three-phase alternating current motor, as defined in claim 2, wherein said active power component Iq is calculated from an averaged value of an integration of the value $\sin\Theta \cdot iu$ over an interval of an integral number of times of one-half cycle interval of the primary frequency and said reactive power component Id is calculated from an averaged value of the integration of the value $-\cos\Theta \cdot iu$ over the interval of an integral number of times of one-half cycle of the primary frequency; and further including:

providing the value of $\Theta$ as a rotational phase of the alternating current excitation voltage vector obtained by integrating the primary frequency command value $\omega_1$ and the current value iu defined as a detected instantaneous current in the phase of performed sine wave modulation.

4. A method of measuring characteristic constants of a three-phase alternating current motor, as defined in claim 1, further comprising:

controlling the inverter based on the primary frequency command value $\omega_1$ and the primary voltage command value $Vc_1$ so as to operate said alternating current motor at a constant speed;

calculating an active power component Iq' and a reactive power component Id' of a current vector $I_1$ of the motor by using a phase value obtained by integrating said primary frequency command value $\omega_1$ and a detected current value of the motor; and measuring at least one of a primary self-inductance $L_1$ and a mutual inductance M of said motor based on the primary frequency command value $\omega_1$, the primary voltage command value $Vc_1$ and said active power component Iq' and said reactive power component Id'.

5. A method of measuring characteristic constants of a three-phase alternating current motor, as defined in claim 4, characterized by determining the primary self-inductance $L_1$ by using the primary resistance $r_1$ and combined leakage inductance Lx which are previously measured based on the following equation:

$$L_1 = \frac{(V_{c_1} - 2r_1 \cdot Iq' - \omega_1 \cdot Lx \cdot Id')V_{c_1} + r_1^2([Id']^2 + [Iq']^2)}{\omega_1[V_{c_1} \cdot Id' - \omega_1 \cdot Lx([Id']^2 + [Iq']^2)]}.$$

6. A controller for controlling a three-phase alternating current motor using an inverter apparatus comprising:

a three-phase inverter for converting direct current voltage into a three-phase alternating current so as to supply the three-phase alternating current to said motor; and a controller for controlling the magnitude and pulse-width of an output voltage of said inverter said controller comprising:
  (a) means for producing single-phase alternating current excitation signals based on a primary frequency command value $\omega_1$ and a primary voltage command value $Vc_1$ for said three-phase inverter, and a detected current value of the three-phase motor;
  (b) means for controlling the three-phase inverter by single-phase alternating current excitation in response to said single-phase alternating current excitation signals so as to output single-phase alternating current to the three-phase motor;
  (c) means for calculating an active power component of current Iq and a reactive power component of current Id for the three-phase motor based on a phase value obtained by integrating said primary frequency command and a detected current value of the three-phase motor controlled by single-phase alternating current excitation; and
  (d) means for measuring a combined resistance $(r_1+r_2)$ of primary resistance $r_1$ and secondary resistance $r_2$ of the three-phase motor by calculating a ratio of a value $Vc_1 \cdot Iq$ and a value $(Id^2+Iq^2)$, and a combined leakage inductance $(l_1+l_2)$ of primary leakage inductance $l_1$ and secondary leakage inductance $l_2$ of the three-phase motor by calculating a ratio of a value $Vc_1 \cdot Id$ and a value $\omega_1 (Id^2+Iq^2)$.

7. A controller for controlling a three-phase alternating current motor according to claim 6, wherein said means for producing the single-phase alternating current excitation signals includes means for supplying pulse width modulation signals of a carrier wave command signal modulated by a sine wave to only one phase out of three phases of the three-phase motor and pulse width signals having a conduction rate which is 1/2 to the other two phases of the three-phase motor; and further comprising:

means for correcting the pulse width signals according to a pulse width $T\lambda$ depending on the current polarity of the motor, said pulse width $T\lambda$ corresponding to an inverter output voltage error due to a dead time required to prevent a short-circuit between positive- and negative arms of the inverter and an ON-state voltage drop in power semiconductor elements of the inverter.

8. A controller for controlling a three-phase alternating current motor according to claim 6, said controller further comprising:
  (e) means for controlling the inverter based on the primary frequency command value $\omega_1$ and the primary voltage command value $Vc_1$ so as to operate said alternating current motor at a constant speed,
  (f) means for calculating an active power component Iq' and a reactive power component Id' of a current vector $I_1$ of the motor by using a phase value obtained by integrating said primary frequency command value $\omega_1$ and a detected current of the motor; and (g) means for measuring at least one of a primary self-inductance $L_1$ and a mutual inductance $M$ of the motor based on the primary frequency command value $\omega_1$, the primary voltage command value $Vc_1$ and said active power component $Iq'$ and said reactive power component $Id'$.

* * * * *